Patented Aug. 18, 1953

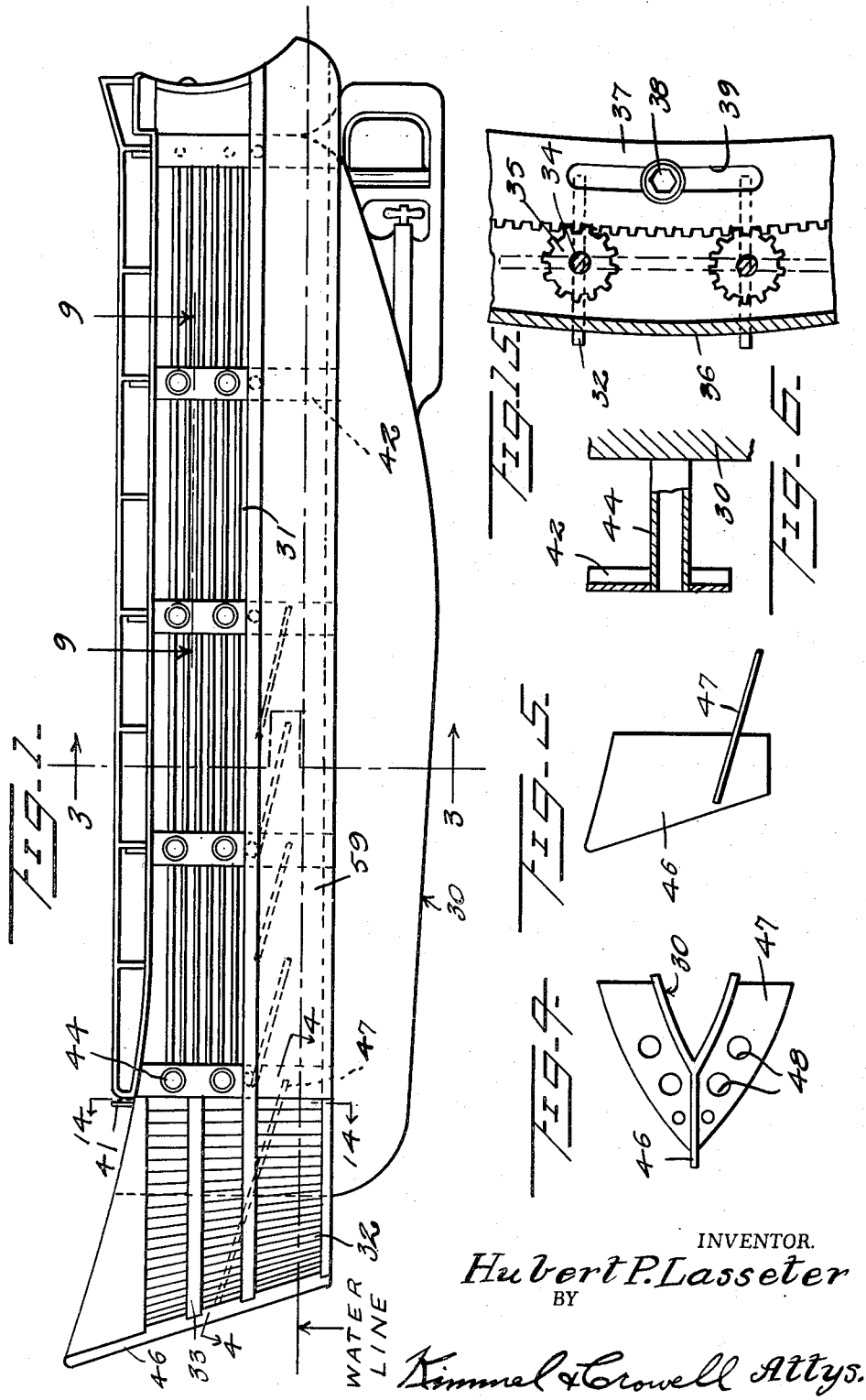

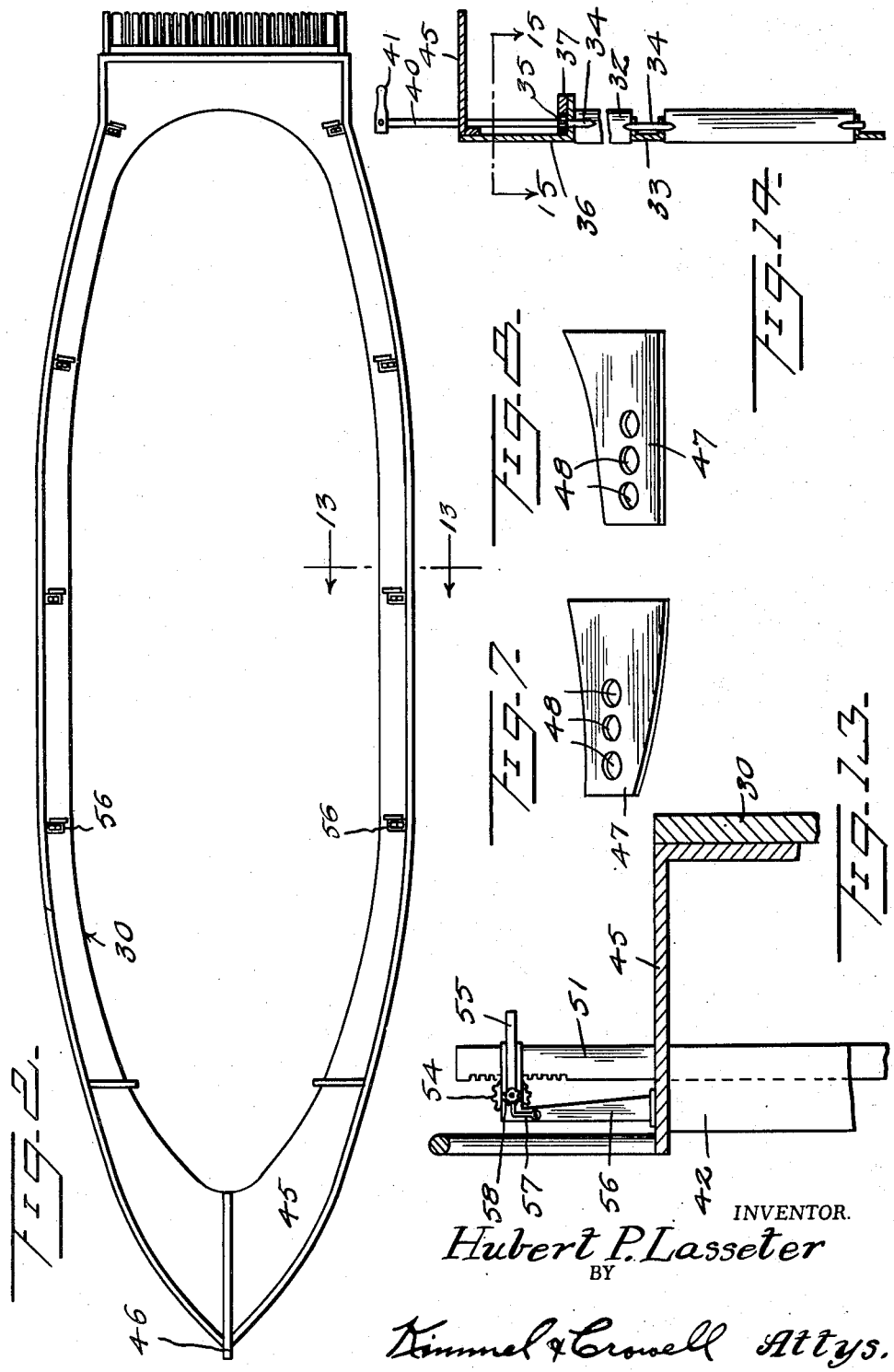

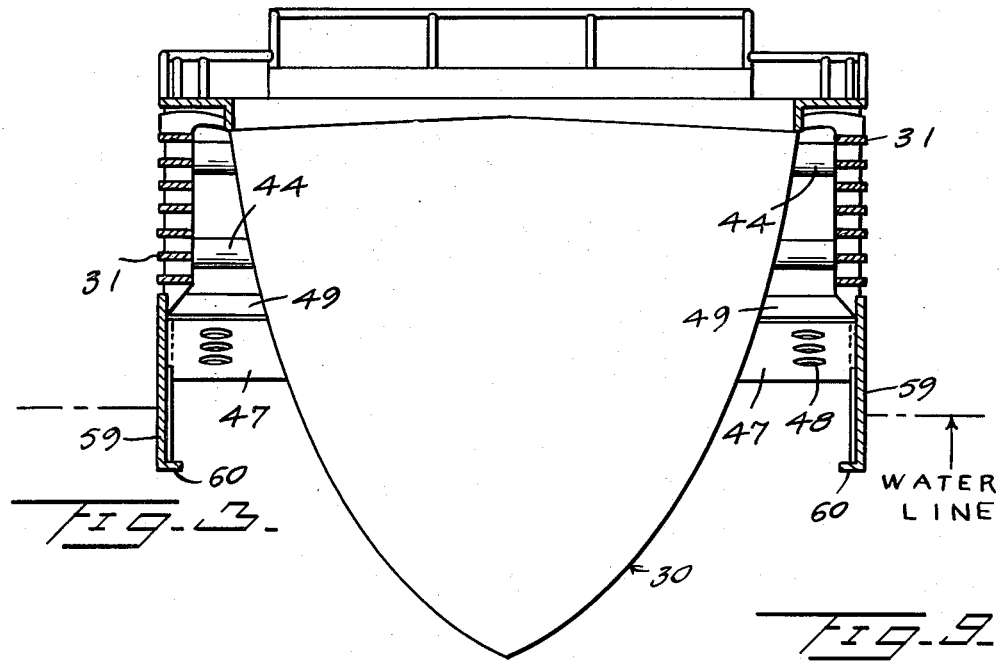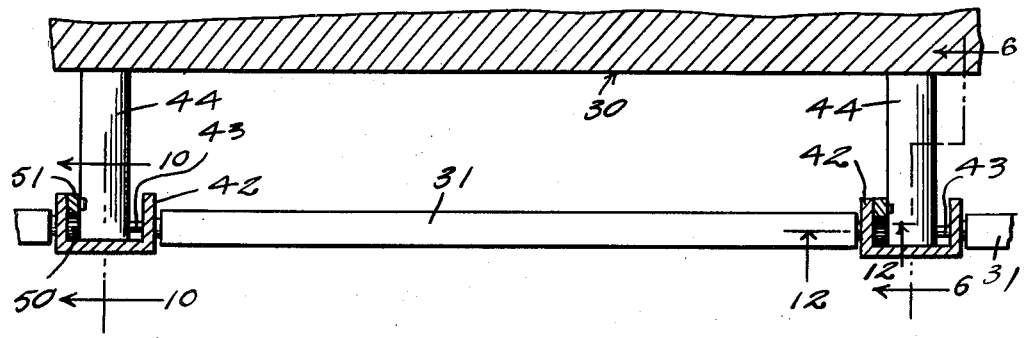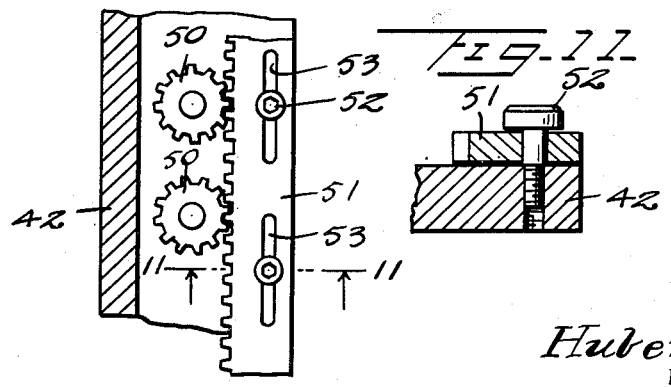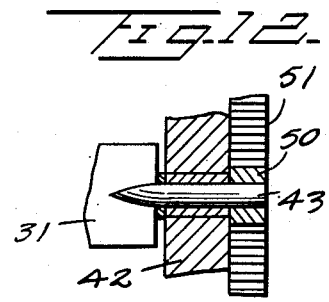

2,649,068

UNITED STATES PATENT OFFICE 2,649,068

SHIP STABILIZER

Hubert P. Lasseter, Havana, Fla., assignor of one-half to George P. Koelliker, Tallahassee, Fla.

Original application February 27, 1946, Serial No. 650,399. Divided and this application November 17, 1949, Serial No. 127,885

1 Claim. (Cl. 114—126)

The invention relates to a stabilizing means for vessels and is a division of my application bearing Serial Number 650,399, filed February 27, 1946, now Patent No. 2,508,068.

An object of this invention is to provide a means for attachment to the sides of a vessel, particularly a fairly small vessel such as a fishing vessel or the like, whereby the vessel will remain on a more even keel during heavy weather.

Another object of this kind is to provide in a vessel an improved means for breaking up the waves striking the vessel when the latter is either anchored or moving so that the vessel will not be subjected to the impact of a large body of water.

A further object of this invention is to provide in a vessel an outer shell which may be rendered perforate or substantially imperforate as desired depending upon weather and water conditions.

A further object of this invention is to provide in a vessel an outer shell which is formed of pivoted plates or slats which in their closed positions are adapted to overlap each other, and which in their open positions are inclined in a manner to break up force of the impact of the waves by dividing the waves into small streams of water.

Still a further object of this invention is to provide a device which may be applied to any floating, mobile or stationary unit subject to the action of waves for breaking up the waves, as a breakwater, thereby protecting the unit from the action of large waves.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 1 is a side view of a vessel constructed according to an embodiment of this invention, Figure 2 is a top plan view, Figure 3 is a vertical section taken on the line 3—3 of Figure 1, Figure 4 is a transverse section taken on the line 4—4 of Figure 1, Figure 5 is a detail side elevation of the forward stabilizer, Figure 6 is a detail vertical section taken on the line 6—6 of Figure 9, Figure 7 is a perspective plan view of one of the lateral stabilizers, Figure 8 is a perspective plan view of another lateral stabilizer, Figure 9 is a horizontal section taken on the line 9—9 of Figure 1, Figure 10 is a vertical section on line 10—10 of Figure 9 with the port hole tubes removed, Figure 11 is a horizontal section taken on the line 11—11 of Figure 10, Figure 12 is a vertical section taken on line 12—12 of Figure 9.

Figure 13 is a fragmentary section taken on line 13—13 of Figure 2,

Figure 14 is a fragmentary vertical section on line 14—14 of Figure 1,

Figure 15 is a section taken on line 15—15 of Figure 14.

Referring to the drawings, the numeral 30 designates generally the hull of a boat equipped with an embodiment of this invention for stabilizing a boat in rough water.

The stabilizing means operates by breaking up the large waves into smaller waves or streams, and this is accomplished by providing series of vanes or fins 31 and 32 along the sides and bow of a boat, which may be closed in smooth water to provide the least amount of resistance, and may be opened to form a grating to break up the waves in rough water.

The forward vanes 32 are supported in a vertical position along the bow of the ship by a series of vertically spaced apart channel beams 33 which are spaced outwardly from the sides of the ship 30. The vanes 32 are rockably mounted on the beams 33 and the lower vanes 32 are fixed to the vane immediately above by a rod 34 (Figure 14), which is loosely carried by the beam 33. To rock the vanes a spur gear 35 is fixed to the rod 34 attached to the upper end of the uppermost vane 32, above the flange of the upper supporting beam 36.

A gear rack 37 is slidably secured to the upper side of the flange 36 by a bolt 38, fixed to the flange, engageable in the slot 39 of the rack 37. The teeth of the rack 37 engage the teeth of the gear 35 whereby any sliding movement of the rack 37 will rock the vanes 32 to open or closed position. The rack 37 is actuated by one of the gears 35, which is provided with a crank 40 having a handle 41, which may be actuated by an operator.

The vanes 32 are supported outwardly from the side of the ship by an extension of the deck plate 45, and the beams 33 are supported from the ship 30 by a vertical bow plate 46, and by fixed lateral air stream deflector plates 47. The plates 47 are fixed to the ship 30 so that the plates extend rearwardly and downwardly a short distance above the normal water line. The plates 47 are provided with openings 48 to break up the waves striking upwardly against the bottom of these plates 47. A plurality of plates 47 are extended along the sides of the ship, just above the water line.

Immediately after the bow vanes 32, a series of horizontally rockable vanes 31 are provided along the sides of the ship. The vanes 31 are rockably supported from a series of vertical channel beams 42 by a rod 43 fixed to the ends of the vanes and extending through the flange of the beam 42. The beams 42 are supported outwardly from the sides of the ship 30 by a number of tubular supports 44, which are fixed to the sides of the ship 30. The tubes 44 are adapted to be secured to the port holes of the ship, so that the vision through the port holes is not obstructed by the vanes 31.

The vertical beams 42 extend downwardly from a point substantially level with the deck of the ship 30 to a point above the water line and just above the stabilizer plates 47. Smaller tubular supports 49 fix the lower end of the beams 42 to the side of the ship 30.

A spur gear 50 (Figures 9 and 10) is fixed to the rod 43 between the beam 42 and the tube 44, for rocking the vanes 31 to open or closed position. Engaging the gears 50 is a gear rack 51 which is slidably mounted to a flange of the beam 42 by bolts 52, fixed to the beam 42 and engaging in elongated slots 53 in the rack 51. The rack 51 is actuated by a gear 54, mounted above the deck of the ship, having a crank 55 fixed to a rod engageable through the support 56 and fixed also to the gear 54. A spring pressed detent 57, fixed to the support 56 engages with gear teeth 58, formed in the hub of the crank 55 to lock the crank 55 in any selected position whereby the vanes are locked in any position from full open to full closed.

Also supported from the beams 42 is a vertical air stream deflector housing 59, which extends along the side of the ship 30, and downwardly below the water line a short distance. The lower end of the housing 59 is turned inwardly to form a short flange 60. The lateral plates 47 are fixed between the vertical stabilizer 59 and the side of the ship 30.

The overlapped position of the apertured stabilizer plates 47 extending between the hull 30 of the vessel and the vertical stabilizers 59 spaced outwardly from the hull and formed with horizontal flanges 60 turned inwardly toward the hull form channels for controlled passage of air and water along the sides of the vessel. The force developed by water and air rushing through these channels on forward motion of the vessel is utilized to stabilize the vessel. It is obvious that the lift effected by the air passing through the channels above the normal water line of the vessel will be increased as the speed of the vessel is increased. Furthermore, by merely increasing the width of the lateral plates 47 increased air lift effect may be attained as desired. In medium sized vessels, such as patrol craft, sub chasers or the like, such an increase in the width of the lateral air deflectors is highly desirable as it would not only effect greater economy of operation but would make greater speeds possible of attainment by reason of the increased air lift provided thereby. Controlled stability of the vessel is also easily attainable with the instant construction as the above mentioned stabilizing forces for which the assemblage is designed can be controlled at will by opening or closing the prow grill as found desirable since separate controls for the prow grills are provided at each side of the hull. The channels extending along either the port or starboard sides of the vessel can be individually affected so that the air stream force and air lift of either channel can be effected to various degrees either manually or gyroscopically as desired or warranted by the size of the ship and the turbulence of the sea in which it is being operated.

Still another desirable effect of the apertured plates 47 positioned above the surface of the water between the hull of the vessel and the vertical side plate deflectors 59 is that the air tunnels formed thereby confine the air entering therein as it rushes therethrough above the water so as to have a leveling effect on the water within the tunnels at the sides of the vessel. The apertured arrangement of the plates is such as to break up the crest of any waves rising above the normal water line of the vessel as they enter the channels and thereby prevent the waves from disturbing the vessel.

It will also be apparent that by extending the apertured plates 47 throughout the length of the vessel stern drag may be greatly reduced if not entirely eliminated.

Thus by this invention I also obtained the object of providing channels extending longitudinally of a ship or vessel through which the passage of air and water is directed to add control lift at each side of the hull of a ship.

In accordance with the patents statutes I have herein described the principle and operation of my invention, together with the apparatus which I now consider to represent the best embodiments thereof, but I desire to have it understood that the apparatus shown is only illustrative and that the invention can be carried out by other means. Also, while it is designed to use the various features and elements in the combination and relations described, some of these may be altered and others omitted without interfering with the general results outlined, and the invention extends to such use and it is therefore intended that the scope of the invention be regarded as limited only by the terms of the claim.

I claim:

A stabilizing means for a ship having a floating hull structure, a portion of which extends above the water line, a plurality of spaced transverse supports extending outwardly on opposite sides of said hull structure, depending members carried by said supports, horizontally extending vertically disposed plates carried by said depending members and positioned partly below and partly above the water line, a plurality of upwardly and forwardly inclined stabilizer plates carried by said vertical plates disposed between the latter and the hull structure, a skeleton bow frame fixed to said vertical plates and said hull structure, a plurality of vertically disposed vanes in said frame, means pivotally mounting said vanes whereby said vanes may be disposed in closed position or in open wave breaking position.

HUBERT P. LASSETER.

References Cited in the file of this patent

UNITED STATES PATENTS

| Number | Name | Date |
|---|---|---|
| 650,758 | Lake | May 29, 1900 |
| 1,314,227 | Tolman | Aug. 26, 1919 |
| 1,460,844 | Bullis | July 3, 1923 |
| 1,499,900 | Zucker | July 1, 1924 |
| 2,040,984 | Francesco et al. | May 19, 1936 |
| 2,385,985 | Harrison | Oct. 2, 1945 |

FOREIGN PATENTS

| Number | Country | Date |
|---|---|---|
| 19,496 | Great Britain | of 1893 |